US012683468B2

(12) United States Patent
Leake, Jr. et al.

(10) Patent No.: US 12,683,468 B2
(45) Date of Patent: Jul. 14, 2026

(54) SYSTEMS AND METHODS FOR A PROTECTIVE DEVICE FOR AIR CONDITIONER UNITS

(71) Applicant: Robert Edward Leake, Jr., Salado, TX (US)

(72) Inventors: Robert Edward Leake, Jr., Salado, TX (US); Michael David Splawn, Salado, TX (US)

(73) Assignee: Robert Edward Leake JR., Salado, TX (US)

( * ) Notice: Subject to any disclaimer, the term of this patent is extended or adjusted under 35 U.S.C. 154(b) by 189 days.

(21) Appl. No.: 18/812,634

(22) Filed: Aug. 22, 2024

(65) Prior Publication Data

US 2026/0058530 A1 Feb. 26, 2026

(51) Int. Cl.
H02K 11/25 (2016.01)
F24F 11/88 (2018.01)

(52) U.S. Cl.
CPC .............. H02K 11/25 (2016.01); F24F 11/88 (2018.01)

(58) Field of Classification Search
CPC ................................. H02K 11/25; F24F 11/88
See application file for complete search history.

(56) References Cited

U.S. PATENT DOCUMENTS

| | | | | |
|---|---|---|---|---|
| 4,023,071 A | * | 5/1977 | Fussell | H02H 9/005 |
| | | | | 361/111 |
| 5,379,606 A | * | 1/1995 | Katsuki | F24F 11/63 |
| | | | | 62/126 |
| 5,408,842 A | * | 4/1995 | Goto | B60H 1/00978 |
| | | | | 62/243 |
| 5,854,730 A | * | 12/1998 | Mitchell | H02H 9/04 |
| | | | | 361/111 |
| 6,430,017 B1 | * | 8/2002 | Finlay, Sr. | H02H 9/042 |
| | | | | 361/104 |
| 7,561,388 B2 | | 7/2009 | Sung et al. | |
| 7,573,692 B1 | | 8/2009 | Weeks | |
| 8,243,402 B2 | | 8/2012 | Benoit et al. | |
| 8,587,148 B2 | | 11/2013 | Garb et al. | |
| 9,543,083 B2 | | 1/2017 | Darr et al. | |
| 10,971,918 B2 | | 4/2021 | Kurniawan | |
| 11,160,897 B1 | * | 11/2021 | Shalvi | A61L 2/24 |
| 11,456,584 B1 | * | 9/2022 | Taylor | H01H 9/0228 |
| 12,003,088 B2 | * | 6/2024 | Politis | H02H 9/041 |
| 2004/0169982 A1 | * | 9/2004 | Bunton | H02H 9/06 |
| | | | | 361/111 |
| 2005/0198982 A1 | * | 9/2005 | Kubo | B60H 1/00978 |
| | | | | 62/236 |
| 2006/0056127 A1 | * | 3/2006 | Lewis | H02H 9/005 |
| | | | | 361/118 |
| 2006/0279885 A1 | * | 12/2006 | Sung | H02H 9/042 |
| | | | | 361/42 |

(Continued)

FOREIGN PATENT DOCUMENTS

| | | | | |
|---|---|---|---|---|
| CN | 107430914 B | * | 11/2019 | ........... H01H 37/761 |
| KR | 102024091 | | 12/2018 | |
| KR | 20190104506 | | 9/2019 | |

*Primary Examiner* — Dharti H Patel
(74) *Attorney, Agent, or Firm* — Pierson IP, PLLC

(57) ABSTRACT

A protective device that includes a thermal fuse and a metal oxide varistor (MOV) fuse positioned in series downstream of a main breaker, wherein a transformer's primary windings are positioned upstream from the MOV fuse and downstream of the thermal fuse.

10 Claims, 3 Drawing Sheets

(56)          References Cited

U.S. PATENT DOCUMENTS

| | | | |
|---|---|---|---|
| 2007/0103327 A1* | 5/2007 | Zimmermann ...... | G08B 21/185 |
| | | | 340/652 |
| 2009/0021881 A1* | 1/2009 | Crevenat .................. | H02H 9/06 |
| | | | 361/111 |
| 2011/0240623 A1* | 10/2011 | McGaugh .............. | H05B 1/028 |
| | | | 219/202 |
| 2013/0180972 A1* | 7/2013 | McGaugh ............ | B60H 1/2212 |
| | | | 219/202 |
| 2014/0118867 A1* | 5/2014 | Becerra .................... | H02H 7/09 |
| | | | 361/33 |
| 2015/0253364 A1* | 9/2015 | Hieda ................. | H02J 13/1333 |
| | | | 702/62 |
| 2015/0311695 A1* | 10/2015 | West ........................ | H02H 3/20 |
| | | | 361/33 |
| 2016/0189858 A1* | 6/2016 | Bormann ................ | H01F 27/34 |
| | | | 336/150 |
| 2017/0207049 A1 | 7/2017 | Yang | |
| 2020/0382337 A1* | 12/2020 | Portillo ................... | H04L 12/40 |
| 2022/0311243 A1* | 9/2022 | Cong ........................ | H02H 9/06 |
| 2023/0046251 A1* | 2/2023 | Beauregard .............. | H02H 9/04 |
| 2023/0249520 A1* | 8/2023 | Turudic ............. | B60H 1/00385 |
| | | | 165/201 |
| 2024/0266823 A1* | 8/2024 | Pahl ......................... | H02H 7/22 |
| 2024/0345141 A1* | 10/2024 | Struck-Süssmeier ........................ | |
| | | | G01R 19/16547 |
| 2024/0426499 A1* | 12/2024 | Chaiklin ................... | F24F 11/46 |
| 2025/0130265 A1* | 4/2025 | Begley ................. | G01R 31/085 |
| 2026/0058530 A1* | 2/2026 | Leake, Jr. .............. | H02K 11/25 |

* cited by examiner

300

SYSTEMS AND METHODS FOR A PROTECTIVE DEVICE FOR AIR CONDITIONER UNITS

BACKGROUND INFORMATION

Field of the Disclosure

Examples of the present disclosure are related to systems and methods for a protective device for an AC unit. More specifically, embodiments describe a protective device that includes a thermal fuse and a metal oxide varistor (MOV) fuse positioned in series downstream of a main breaker, wherein a transformer's primary windings are positioned upstream from the MOV fuse and downstream of the thermal fuse.

Background

Heating, ventilating, and air conditioning (HVAC) technology is directed toward providing thermal comfort and higher air quality within a confined space. HVAC is important in the design of industrial and residential buildings where safe and healthy building conditions are regulated concerning temperature, humidity, fire and smoke standards, and air quality.

Conventionally, HVAC units may have a protection device with a single fuse positioned or surge protector. After the single fuse ruptures, an electrical panel breaker may be set. However, before the breaker in the electrical panel is set, the transformer may still receive surge power that can damage the controller and circuitry of the transformer.

Accordingly, needs exist for systems and methods for a protective device, positioned downstream from the main breaker, which includes a thermal fuse and a metal oxide varistor (MOV) fuse positioned in series. The primary windings of a transformer may be positioned upstream from the MOV fuse and downstream of the thermal fuse, whereby activating the thermal fuse may shut down power to the transformer without setting a breaker or harming the transformer controller.

SUMMARY

Examples of the present disclosure are related to systems and methods for a protective device a thermal fuse and a metal oxide varistor (MOV) fuse positioned in series. The primary windings of a transformer may be positioned upstream from the MOV fuse and downstream of the thermal fuse, whereby activating the thermal fuse may shut down power to the transformer without setting a breaker or harming the transformer controller.

This may be different from conventional systems that utilize only a single MOV and a single fuse positioned at a main breaker, wherein spikes in temperature cause the poles of the single MOV to be fused together and flip the main breaker. This also may be different where the load applied across a thermal fuse or MOV is conventionally applied in parallel to the protection device.

Embodiments are specifically configured to operate for HVAC systems, such as an AC unit with a motor and a transformer that can operate with different voltages.

In embodiments, the protective device may be configured to be electrically positioned between a power input, ground, motor, and a transformer's primary windings. In operation, line voltage may be received by the protective device, and the line voltage may flow through the device to the motor and the transformer's primary windings.

The protective device may include a first type of a fuse and a second type of fuse. If the amperage across the first fuse causes the temperature across the first fuse to become greater than a predetermined threshold, the first type of fuse on each leg may interrupt power going to the transformer's primary winding without impacting power going to the motor. The second type of fuse may be configured to protect each incoming line by dissipating excess surges and voltages before reaching the motor, which may occur without impacting the voltage supplied to the transformer's primary winding.

Conventionally, if the amperage created by a temperature across the second type of fuse is greater than the predetermined threshold, the poles of the second type of fuse would melt and blend together. This would cause the breaker at the master panel to switch, while also causing harm to the circuitry receiving power from the transformer's primary winding. However, because the first type of fuse breaks, at a location electrically upstream from the transformer's primary windings and the second type of fuse, the transformer's primary winding does not receive amperage greater than the predetermined threshold while still allowing power to go to the motor and without tripping the main breaker.

In specific embodiments, a light indicator, such as an LED coupled to the transformer's primary windings may not receive power when the first type of fuse is blown. This may indicate to a technician that the transformer's primary winding is not receiving power without tripping the breaker at the master panel.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions, or rearrangements may be made within the scope of the invention, and the invention includes all such substitutions, modifications, additions, or rearrangements.

BRIEF DESCRIPTION OF THE DRAWINGS

Non-limiting and non-exhaustive embodiments of the present invention are described concerning the following figures, wherein reference numerals refer to like parts throughout the various views unless otherwise specified.

DETAILED DESCRIPTION

In the following description, numerous specific details are outlined to provide a thorough understanding of the present embodiments. It will be apparent, however, to one having ordinary skill in the art that the specific detail need not be employed to practice the present embodiments. In other instances, well-known materials or methods have not been described in detail to avoid obscuring the present embodiments.

Additionally, any examples or illustrations given herein are not to be regarded in any way as restrictions on, limits to, or express definitions of any term or terms with which they are utilized. Instead, these examples or illustrations are to be regarded as being described concerning one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," and "in one embodiment." Embodiments may be configured to operate as a protection device for a transformer's primary windings for an air-conditioning unit without tripping a breaker at a main electrical panel.

Figure 1:
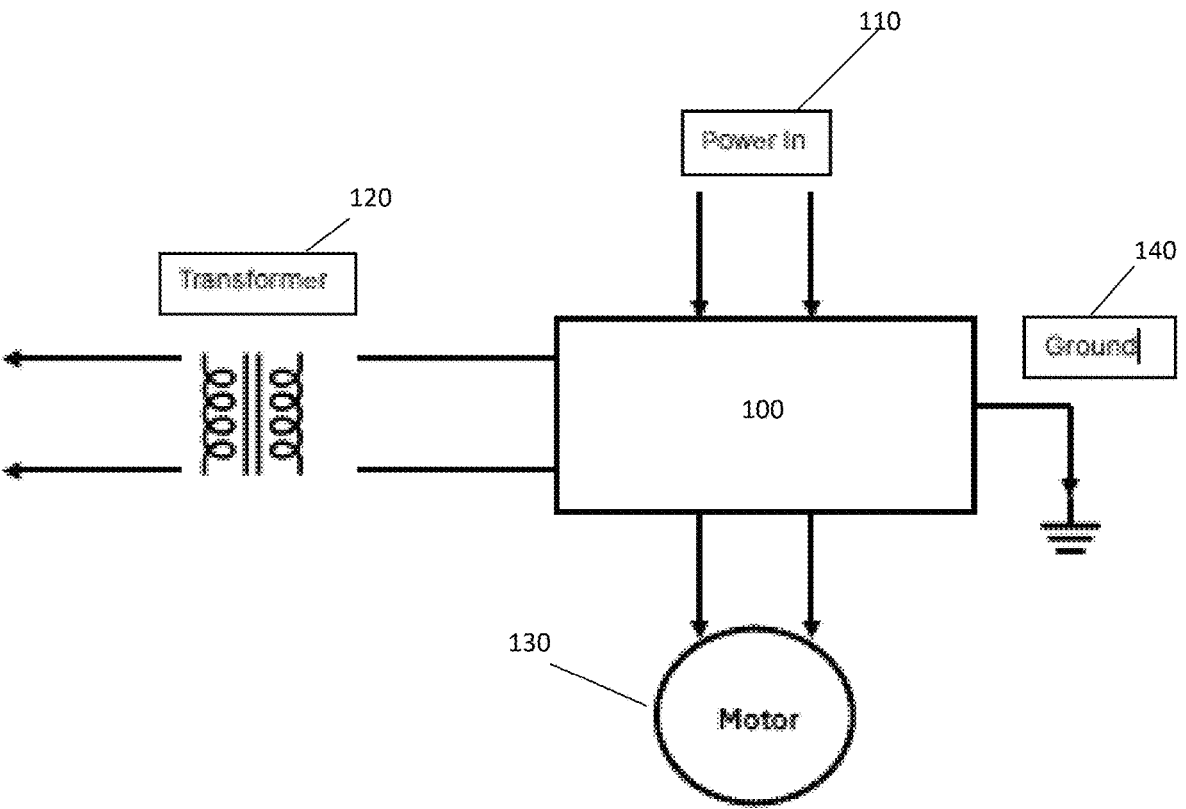
FIG. 1 depicts an embodiment of a protective device for an AC unit, according to an embodiment.

Turning now to FIG. 1, FIG. 1 depicts an embodiment of a protective device 100 for an AC unit. Protective device 100 may be configured to limit surges of voltage and current to a transformer's primary winding before a main breaker panel is flipped. In embodiments, the main breaker may include at least one fuse that is positioned upstream from protective device 100.

Protective device 100 may be configured to receive line power 110 from an upstream breaker box. For example, line power 110 may be 240V, which may be utilized to power an air conditioning unit. Protective device 100 may also be coupled to electrical ground 140.

In operation, the power supplied from line power 110 may be communicated to motor 130 of the AC unit and the transformer's primary winding 120 of the AC unit. In embodiments, the transformer's primary winding 120 may be configured to supply power to a controller of the AC unit, which can be damaged due to surges in power to the AC unit.

Figure 2:
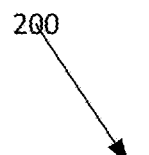
FIG. 2 depicts a detailed schematic of a protective device, according to an embodiment.
Figure 2:
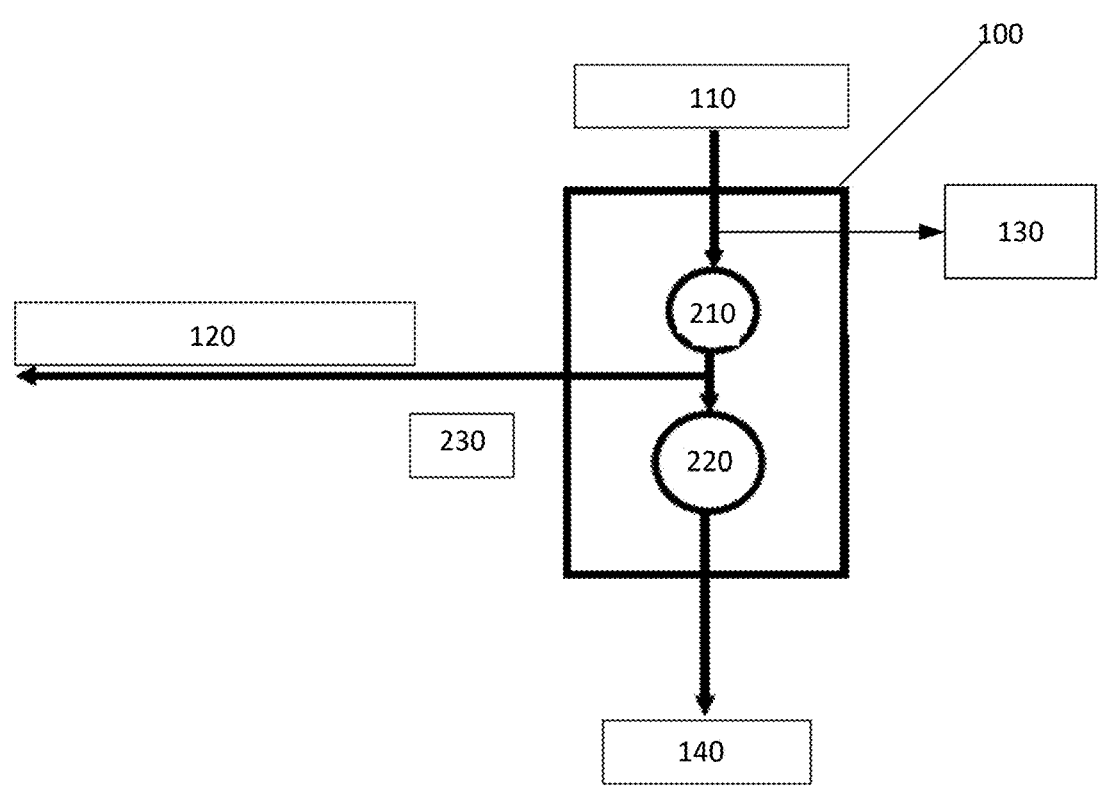

FIG. 2 depicts a detailed schematic 200 of protective device 100, according to an embodiment. Elements depicted in FIG. 2 may be described above, and for the sake of brevity, a further description of these elements may be omitted.

As depicted in FIG. 2, protective device 100 may include a first fuse 210 and a second fuse 220 positioned in series, which are both positioned downstream from fuses at a main breaker panel.

First fuse 210 may be a first type of fuse and may be configured to be activated responsive to a temperature across the first fuse 210 reaching a temperature threshold. In specific embodiments, the first fuse 210 may be a thermal fuse that operates as a thermal cutoff safety device. First fuse 210 may detect the heat caused by the over-current due to a short circuit or component breakdown. After the first fuse 210 is activated, the first fuse 210 may not be reset, and may need to be replaced. In embodiments, the first fuse 210 may be activated before the poles of the second fuse 220 reach a sufficient temperature that would cause the second fuse 220 to break.

Second fuse 220 may be a second type of fuse and may be configured to be a surge-protecting electronic component with an electrical resistance that varies with the applied voltage. In specific embodiments, the second fuse 220 may be a metal-oxide varistor (MOV) fuse. Second fuse 220 may be configured to protect each incoming line by dissipating excess surges and voltages before reaching motor 130. If the second fuse 220 becomes too hot, the first fuse 210 on each leg interrupts power going to the transformer's primary windings 120, but may not interrupt the power going to motor 130.

As depicted in FIG. 2, motor 130 may be positioned upstream from a first fuse 210 and a second fuse 220. This may allow motor 130 to receive power even if the first fuse 210 or second fuse 220 is activated.

As further depicted in FIG. 2, the transformer's primary windings 120 are positioned downstream from the first fuse 210 but upstream from the second fuse 220 and may be the only element positioned between the first fuse 210 and second fuse 220. Accordingly, after the first fuse 210 is activated, the transformer's primary windings 120 may no longer receive power, which may turn off an indicator LED 230.

Figure 3:
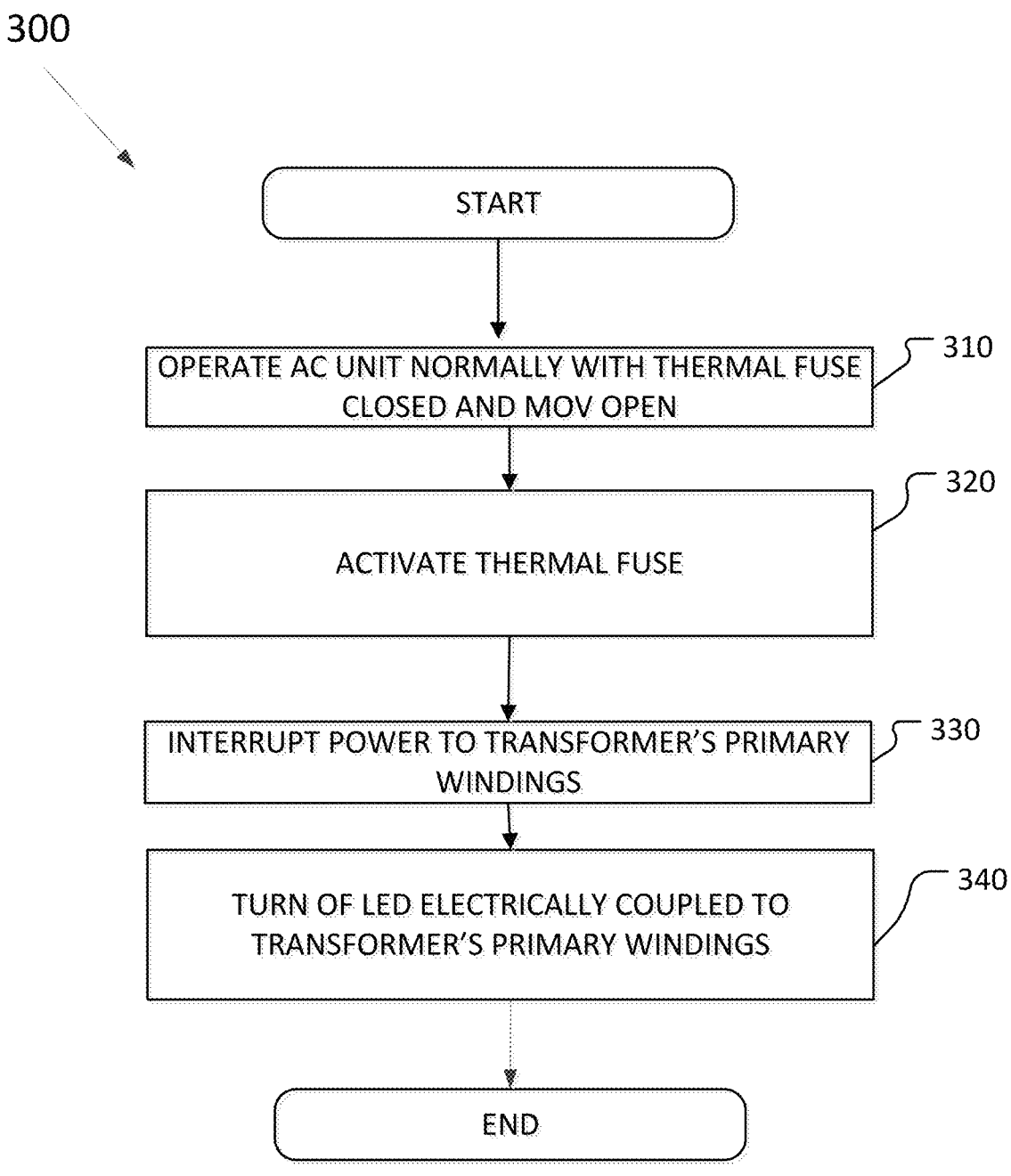
FIG. 3 depicts a method for utilizing a protective device to manage surges to a transformer's primary windings while still allowing power to a motor of an AC unit, according to an embodiment Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted to facilitate a less obstructed view of these various embodiments of the present disclosure.

FIG. 3 depicts a method 300 for utilizing a protective device to manage surges to a transformer's primary windings while still allowing power to a motor of an AC unit, according to an embodiment. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

At operation 310, line voltage may be configured to supply power to a protective device, wherein the protective device may be in electrical communication with a motor and a transformer's primary windings. In operation 310, a thermal fuse may be closed and an MOV may be open, allowing the line voltage to go to the transformer's primary windings, while the MOV absorbed surges and spikes of voltages, wherein the thermal fuse and the MOV are positioned in series.

At operation 320, the thermal fuse may be activated due to a temperature across the thermal fuse being greater than a predetermined threshold.

At operation 330, due to the thermal fuse being activated power to the transformer's primary windings may be interrupted while power to a motor may not be interrupted, all without tripping a main breaker. This may be due to the transformer's primary windings being positioned upstream from the MOV but downstream from the thermal fuse, while the motor may be electrically coupled upstream of both.

At operation 340, due to the transformer's primary windings no longer receiving power, an LED electrically coupled to the transformer's primary windings may be turned off. This may indicate to a technician that the thermal fuse for the protection device has been activated, which may occur without harming the MOV, the controller, or any load positioned between the MOV or the thermal fuse, or the fuse at the main breaker.

Although the present technology has been described in detail for illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment," "an embodiment" "one example," or "an example" means that a particular feature, structure, or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

What is claimed is:

1. A protective device for an air conditioning unit, the protective device comprising:
   a thermal fuse, positioned downstream from a main breaker;
   a metal oxide varistor (MOV) fuse positioned downstream and in series with the thermal fuse;
   primary windings of a transformer being electrically coupled to power downstream of the thermal fuse and upstream of the MOV fuse within the protective device.

2. The protective device of claim 1, wherein the thermal fuse is configured to be activated based on a temperature across poles of the thermal fuse being greater than a predetermined temperature threshold.

3. The protective device of claim 2, wherein the MOV fuse is configured to control surges to voltages.

4. The protective device of claim 3, wherein the thermal fuse is configured to be activated before the main breaker is activated.

5. The protective device of claim 3, wherein the thermal fuse is configured to be activated before poles of the MOV fuse are bonded together.

6. The protective device of claim 2, wherein a motor is positioned electrically upstream of the thermal fuse, and is electrically coupled to the protective device.

7. The protective device of claim 6, wherein the motor is configured to receive power after the thermal fuse is activated.

8. The protective device of claim 2, further comprising:
   a light-emitting diode that is configured to emit light before the thermal fuse is activated, and does not emit light after the thermal fuse is activated.

9. The protective device of claim 8, wherein the light-emitting diode is electrically positioned between the thermal fuse and the MOV fuse.

10. The protective device of claim 1, wherein the thermal fuse interrupts power transmitted to the primary windings of the transformer and a control circuitry for the air conditioning unit without flipping the main breaker.

* * * * *